(12) United States Patent
Pitzo et al.

(10) Patent No.: US 9,390,089 B2
(45) Date of Patent: *Jul. 12, 2016

(54) DISTRIBUTED CAPTURE SYSTEM FOR USE WITH A LEGACY ENTERPRISE CONTENT MANAGEMENT SYSTEM

(71) Applicant: WAUSAU FINANCIAL SYSTEMS, INC., Mosinee, WI (US)

(72) Inventors: Joseph J. Pitzo, Wausau, WI (US); Kurt L. Brzezinski, Mosinee, WI (US); Thomas A. Oberholtzer, Rubicon, WI (US)

(73) Assignee: WAUSAU FINANCIAL SYSTEMS, INC., Mosinee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/644,840

(22) Filed: Mar. 11, 2015

(65) Prior Publication Data
US 2015/0186365 A1 Jul. 2, 2015

Related U.S. Application Data

(63) Continuation-in-part of application No. 12/653,747, filed on Dec. 17, 2009, now Pat. No. 9,002,838.

(51) Int. Cl.
G06F 17/30 (2006.01)
G06Q 40/02 (2012.01)

(52) U.S. Cl.
CPC .... *G06F 17/30011* (2013.01); *G06F 17/30312* (2013.01); *G06F 17/30321* (2013.01); *G06F 17/30569* (2013.01); *G06Q 40/02* (2013.01)

(58) Field of Classification Search
CPC .......... G06F 17/30011; G06F 17/3002; G06F 17/30247
See application file for complete search history.

(56) References Cited

U.S. PATENT DOCUMENTS 6,263,121 B1* 7/2001 Melen et al. ............ 382/305
6,453,356 B1 9/2002 Sheard et al.
(Continued)

OTHER PUBLICATIONS

ISR PCT/US10/60273, Feb. 8, 2011.
(Continued)

*Primary Examiner* — Yuk Ting Choi
(74) *Attorney, Agent, or Firm* — Katten Muchin Rosenman LLP

(57) ABSTRACT

A distributed capture system is disclosed which enables digital content to be captured in various formats and interfaced with a plurality ECM) platforms which enables the distributed capture system to be seamlessly integrated with a customer's legacy ECM system. The system is configured to receive various financial records that are normally created at a financial institution, such as loan applications and customer signature cards, in various formats, such as Microsoft Word, PDF, and Printer Control Language (PCL). The financial records are directed to a virtual printer and converted to a TIFF format. The print stream associated with the text embedded in the TIFF image of the financial record is captured and compared with document classification template. The document classification template allows the document to be automatically classified and indexed. Documents are then sent to the ECM interface. The ECM interface allows financial records that are normally created at the financial institution to be converted to electronic form and stored in the financial institution's legacy ECM. By eliminating the need to purchase a new ECM, the need to convert existing data to the format of the legacy ECM is obviated.

20 Claims, 4 Drawing Sheets

(56) References Cited

U.S. PATENT DOCUMENTS

| | | | |
|---|---|---|---|
| 6,859,797 | B1 | 2/2005 | Skopicki |
| 7,213,022 | B2 | 5/2007 | Whelan et al. |
| 7,568,104 | B2 | 7/2009 | Berryman et al. |
| 2002/0143794 | A1 | 10/2002 | Helt |
| 2004/0249786 | A1 | 12/2004 | Debney et al. |
| 2005/0246311 | A1 | 11/2005 | Whelan et al. |
| 2005/0289059 | A1 | 12/2005 | Brewington et al. |
| 2006/0041828 | A1 | 2/2006 | King et al. |
| 2006/0106706 | A1 | 5/2006 | LaBonty et al. |
| 2007/0162400 | A1 | 7/2007 | Brew et al. |
| 2007/0174281 | A1 | 7/2007 | Chase |
| 2007/0192374 | A1 | 8/2007 | Abnous et al. |
| 2007/0214177 | A1 | 9/2007 | Fujiwara |
| 2007/0260619 | A1 | 11/2007 | Whelan et al. |
| 2008/0005144 | A1 | 1/2008 | Katz et al. |
| 2008/0091761 | A1 | 4/2008 | Tsao |
| 2008/0098455 | A1 | 4/2008 | Hirahara |
| 2008/0177790 | A1 | 7/2008 | Honwad |
| 2008/0201636 | A1 | 8/2008 | Fujiwara |
| 2008/0219557 | A1 | 9/2008 | Dawson et al. |
| 2008/0281871 | A1 | 11/2008 | Wong |
| 2008/0295101 | A1 | 11/2008 | Vicars et al. |
| 2009/0006422 | A1 | 1/2009 | Matsuzawa et al. |
| 2009/0034844 | A1 | 2/2009 | Molnar et al. |
| 2009/0106271 | A1 | 4/2009 | Chieu et al. |
| 2009/0106276 | A1 | 4/2009 | Bouchard |
| 2010/0023773 | A1* | 1/2010 | Todaka ......................... 713/176 |
| 2010/0106973 | A1* | 4/2010 | Guenther ..................... 713/176 |

OTHER PUBLICATIONS

Info-Capture "Remove Paper from the New Account Process with Automated Document Capture and electronic Signatures." http://www.pf-inc.com/infor-capture.asp, Year 2009.

W Wausau Financial Systems—Financial Showcase MavBridge™ Productivity Suite at TAWPI Annual forum & Expo. http://www.mavroimaging.com/news_2008-08_wausaupartner.html, Year 2009.

W Wausau Financial Systems—First Data—Branch Capture—http://www.wausaufs.com/solutionsfinancial/BranchCaptureWebCopy2.cfm, Year 2009.

W Wausau—Reinventing Financial Solutions—Wausau Solution Featured at BAI Retail Delivery Conference & Expo. www.wausaufs.com, Nov. 2007.

AllBusiness—"KeyMark Announces New Product for Their Mailroom Automation Solution". http://www.allbusniess.com/techology/software-services-applications-information/114918, Year 2009.

MAVRO Imaging/MavBridge Diagram—MavBridge™ Solution Suite http://www.mavroimaging.com/mavbridge_diagram.html, Year 2009.

Mircorsoft Office Document Scanning—http://en.wikipedia.org/wiki/Microsoft_Office_Document_Scanning, Feb. 2009.

About Indexing Text in TIFF and MDI Files—Help and How-to-Microsoft Office Online. http://office.microsoft.com/en-us/help/HP030812361033.aspx.., Year 2009.

ECM Connection—Content Management: WAUSAU Financial Systems and Tri City http://www.ecmconnection.com/article.mvc/Content-Managmenet-WAUSAU-Financial-Sy., Year 2009.

Info-Access—Integrating Document Imaging with Loan Document Tracking, Exception Processing and Collateral Management, http://www.pf-inc.com/info-access.asp., Year 2009.

CMS Wire "eCapture Express Aims to Simplify ECM Document Capture" http://www.cmswire.com/cms/document-management/ecapture-express-aims-to-simplify-e, Year 2009.

OnBase—a Hyland Software Solution. http://www.pf-inc.com/onbase.asp, Year 2009.

Harland Financial Solutions—"Hot Topics and Case Studies" http://www.harlandfinancialsolutions.com/hot-topics-case-studieslb.php?subitem_id=20070, Year 2009.

Integra Business Systems, Inc.—Solutions—iDentify eSign. http://www.identifi.net/prod_esign.asp, Year 2009.

Robertson, "Integrating Legacy Systems with Modem Corporate Applications," Communications of the ACM CACM vol. 40 Issue 5, May 1997 from [http://www .cparity.com/projects/ AcmClassification/Samples/253785 .pdf] Figures 1-3.

* cited by examiner

DISTRIBUTED CAPTURE SYSTEM FOR USE WITH A LEGACY ENTERPRISE CONTENT MANAGEMENT SYSTEM

CROSS REFERENCE TO RELATED APPLICATIONS

This application is a continuation-in-part of U.S. patent application Ser. No. 12/653,747, filed on Dec. 17, 2009 and entitled "Distributed Capture System for Use with a Legacy Enterprise Content Management System," by Joseph J. Pitzo et al., which is hereby incorporated by reference in its entirety.

FIELD OF THE INVENTION

The present invention relates to a distributed capture system and more particularly to an improved distributed capture system which enables digital content to be captured in various formats and interfaced with a plurality of Enterprise Content Management (ECM) platforms which enables the distributed capture system to be seamlessly integrated with a customer's legacy ECM system.

BACKGROUND OF THE INVENTION

Distributed capture systems are known in the art. Such distributed capture systems are widely used by financial institutions for electronically processing checks in the aftermath of the so called Check 21 legislation. More particularly, the Check 21 legislation, i.e. the Check Clearing for the 21st Century Act, Public Law 108-100, effective Oct. 28, 2004, allows the recipient of the original paper check, for example, a financial institution, to create a digital version of the original check, called a substitute check, and process the substitute check electronically. As such, the need for further handling of the physical document and transport of the physical document by couriers is eliminated.

Such distributed capture systems are known in the art and include systems for automatically feeding checks and scanning the checks to create an electronic image of the check. The electronic image of the check may be encrypted and transmitted to a central location or processed in the "back office". Examples of such distributed processing systems are disclosed in U.S. Pat. Nos. 5,910,988 and 6,032,137, hereby incorporated by reference.

The check images are stored on a database for processing and archival purposes. The databases used for storing the check images as well as systems for accessing the databases are known as Enterprise Content Management (ECM) systems. Financial institutions utilize such ECM systems to store check images as well as other bank records, such as signature cards and loan applications and other bank records including customer deposit and withdrawal slips, created at the financial institution (hereinafter "financial records") in electronic form.

Examples of such ECM systems are disclosed U.S. Patent Application Publication Nos.: U.S. 2009/0106276 A1; U.S. 2009/0106271 A1; U.S. 2009/0006422 A1; U.S. 2008/0295101 A1; U.S. 2008/0219577 A1; U.S. 2008/0201636 A1; U.S. 2008/0177790 A1; U.S. 2008/0098455 A1; U.S. 2008/0091761 A1; U.S. 2007/0260619 A1; U.S. 2007/0214177 A1; U.S. 2007/0174281 A1; U.S. 2007/0162400 A1; U.S. 2006/0106706 A1; U.S. 2005/0246311 A1; U.S. 2004/0249786 A1; as well as U.S. Pat. No. 7,213,022, all hereby incorporated by reference.

It is known that existing electronic platforms, currently available at financial institutions for scanning and processing checks, are not suitable for processing financial records. More specifically, after the Check 21 legislation was adopted, financial institutions with multiple branch locations would courier checks to a central location for imaging, processing and storage. In order to eliminate the need for couriering the checks to central locations, branch solutions were developed. These branch solutions included check scanners for scanning checks and transmitting electronic images to a central location for processing and storage in an ECM.

Because of the differences in the formats between checks and other financial records, legacy systems for scanning checks are not suitable for scanning other financial records. As such, some financial institutions with multiple branches are still in a position in which financial records need to be couriered to a central location and scanned and converted to electronic form in order to be stored in the financial institution's legacy ECM. In order to store the electronic images of the financial records, the financial records also needed to be categorized and identified for storage and later retrieval in the financial institution's legacy ECM.

More specifically, checks are all encoded with magnetic ink character recognition (MICR) data. Such MICR data is located in relatively the same position on all checks; i.e. along the bottom of the check. The MICR data includes various information including; the bank number, the account number and the check number. After presentment the check is encoded with the amount of the check. When a check is scanned and converted to an electronic image, the MICR data can be read by a conventional by an optical character recognition (OCR) system. Since the MICR data is in a uniform format and located in the same location on all checks, conventional OCR systems can be used to extract data from the checks for archival in a database along with an image of the check. A system for imaging checks and archiving the MICR data in a database along with an image of a check is disclosed in U.S. Pat. No. 6,654,487, hereby incorporated by reference.

Financial records, on the other hand, are quite different than checks. More specifically, financial records exist in different file formats and different size documents and contain personalized data in many different areas on the documents. Thus legacy systems at the branches for scanning checks and converting checks to electronic form for storage on the financial institution's legacy ECM are not suitable for such financial records. As such, financial institutions were known to courier financial records to a central location where the financial records were scanned and entered into a legacy ECM. In addition, data from the financial records was known to be manually extracted from the financial records and entered into the financial institution's legacy ECM.

In order to obviate the need for couriering such financial records to central locations for scanning and manually processing such financial records, systems were developed for enabling such financial records to be converted to electronic form without the need for the documents to be scanned. An example of such a system was developed by Wausau Financial Systems under the trade name eCaptureXpress® ("the Wausau system"). As will be discussed in more detail below, the Wausau system is configured to convert documents in various formats, such as Windows®, Portable Document Format (PDF) and other formats into a Tagged Image File Format (TIFF).

Systems for converting documents to a TIFF format are disclosed in U.S. Pat. Nos. 6,672,212 and 6,995,853. The TIFF format includes an image of the document and embedded text. The print stream of the embedded text is compared with a document classification template for automatically classifying and indexing the document for storage and archival purposes.

Many financial records that are created at the financial institution other than checks need to scanned and archived. Such financial records cannot be scanned by legacy back office systems used for transporting and archiving checks. As such, such financial records are known to be sent by a courier to a central location for scanning. These documents are scanned and archived in the financial institution's legacy ECM. Normally, metadata regarding such financial records is manually entered; a cumbersome and time consuming task. In order to automate the process for such financial records, Distributed Capture. Systems with integrated ECMs have been developed for automatically classifying and indexing such financial records. Unfortunately, such distributed capture systems are integrated with a particular ECM platform. These ECMs are sold under various trade names including: OnBase, OpenText, FileNet and Documentum.

Unfortunately, the data format for the various ECM systems varies. Thus, in order for a financial institution to implement a system for imaging and electronically archiving financial records, the financial institution has to acquire a distributed capture system for such financial records that has the same ECM platform as the financial institution's legacy ECM, if it is available. Alternatively, the financial institution has to convert its existing record data to a format compatible with the native ECM platform. Database data conversion is not known to be 100% accurate. As such, much if not all of the data that has been converted from the legacy format to the native format is known to be manually checked. Aside from being expensive, converting from a legacy ECM platform to a new ECM platform is cumbersome and time consuming.

Thus, there is a need for providing a distributed capture system for imaging and archiving financial records that does not require conversion of existing financial record data from a format required by a legacy ECM to a new format compatible with a new ECM.

SUMMARY OF THE INVENTION

Briefly, the present invention relates a distributed capture system which enables digital content to be captured in various formats and interfaced with a plurality of ECM platforms which enables the distributed capture system to be seamlessly integrated with a customer's legacy ECM system. The system is configured to receive various financial records that are normally created at a financial institution, such as loan applications and customer signature cards, in various formats, such as Microsoft Word, PDF, and Printer Control Language (PCL). The financial records are directed to a virtual printer and converted to a TIFF format. The print stream associated with the text embedded in the TIFF image of the financial record is captured and compared with document classification template. The document classification template allows the document to be automatically classified and indexed. Documents are then sent directly to the ECM interface. In accordance with an important aspect of the invention, the ECM interface allows the distributed capture system to be used with the financial institution's legacy ECM. As such, distributed capture system in accordance with the present invention eliminates the need for financial institutions to replace legacy ECMs in order to enable financial records that are created at the financial institution, such as signature cards and loan applications to be converted to electronic form and stored in the financial institution's legacy ECM. By eliminating the need to purchase a new ECM, the need to convert existing data to the format of the legacy ECM is obviated.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION

Figure 1:
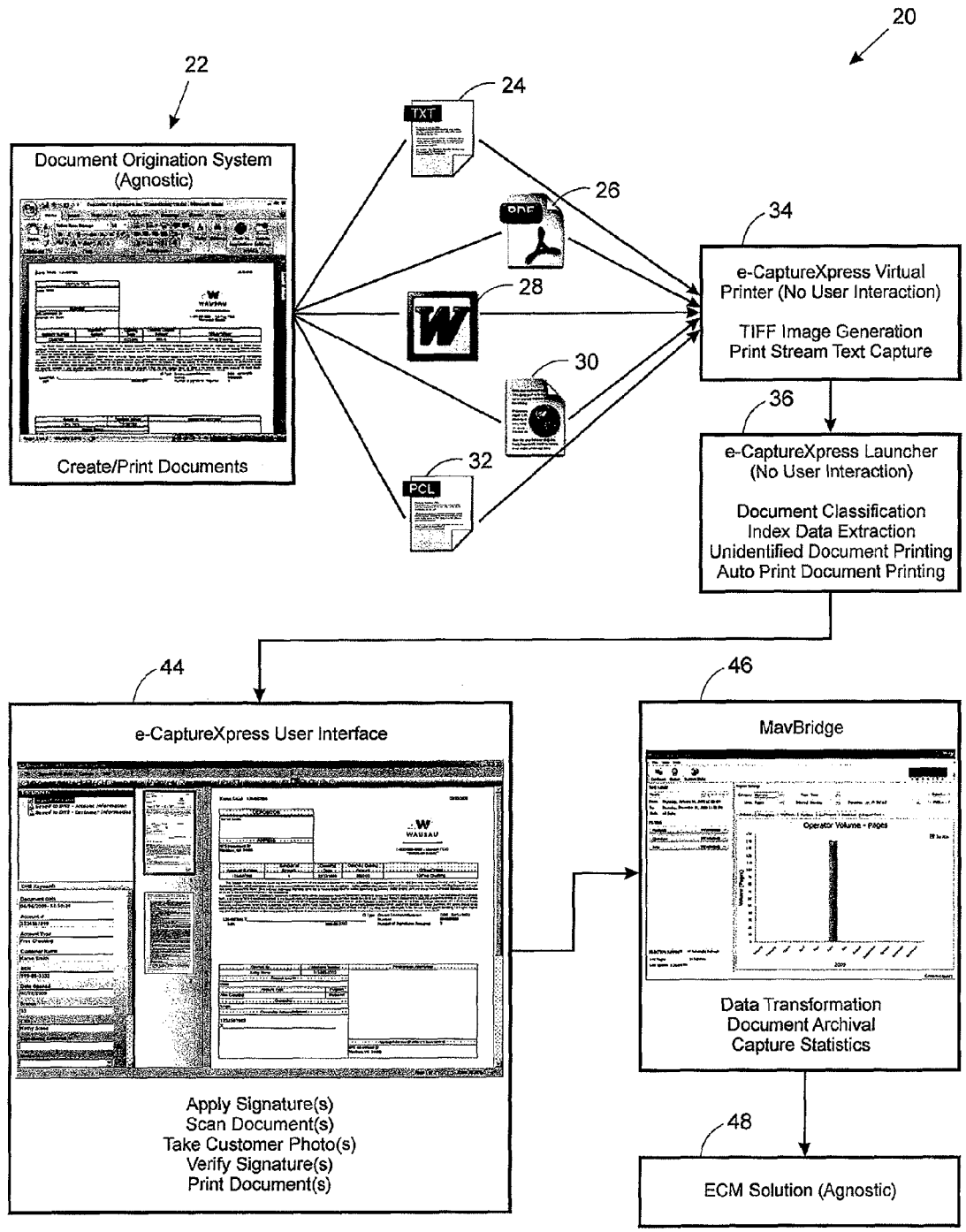
FIG. 1 is a block diagram of the distributed capture system in accordance with the present invention.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The present invention relates to distributed capture system which enables digital content to be captured in various formats and interfaced with a plurality of ECM platforms which enables the distributed capture system to be seamlessly integrated with a customer's legacy Enterprise Content Management (ECM) system. The system is configured to receive various financial records or other documents that are normally created at a financial institution, such as loan applications and customer signature cards, in various formats, such as Microsoft Word, PDF, and Printer Control Language (PCL). The financial records are directed to a virtual printer and converted to a TIFF format. The print stream associated with the text embedded in the TIFF image of the financial record is captured and compared with document classification template. The document classification template allows the document to be automatically classified and indexed. The classification process defines whether the financial record requires user input, such as signature. If user input is required, the document awaits user input at a user interface, such as a TWAIN device. Once the user input is received, the electronic document is sent to an ECM interface. Alternatively, if the document does not require user input, the document is sent directly to the ECM interface.

In accordance with an important aspect of the invention, the distributed capture system enables financial institutions to scan and archive financial records that are normally created at the financial institution, such as signature cards and loan applications, to be archived on the financial institution's legacy ECM. As such, distributed capture system eliminates the need for financial institutions to courier such financial records to a central location and manually extract and input data regarding the financial record into the financial institution's ECM. Additionally, the distributed capture system in accordance with the present invention allows financial records to be converted to electronic form and automatically classified and indexed and stored in the financial institution's legacy ECM without the need to purchase a new native ECM and convert existing data to the format of the legacy ECM.

FIG. 1 is a block diagram of the distributed capture system in accordance with the present invention, generally identified with the reference numeral 20. As shown, various financial records are created at a financial institution which must be archived. These financial records fall into two (2) main categories; documents that require user input and documents that do not require user input. Documents that require user input include signature cards, loan documents and other documents that require a customer signature or other input, such as notarization. Documents that do not require further customer input include personal customer IDs, customer photographs and customer loan supporting documentation, transaction slips, such as deposit slips and withdrawal slips and virtually any document that needs to be needs to be archived.

These financial records may be originated by way of various document origination systems, generally identified with the reference numeral 22. For example, exemplary document origination systems 22 are used to create documents in various formats including; plain text documents 24, portable document format (PDF) documents 26, Microsoft Word® documents 28, html documents 30 and documents 32 created in Printer Control Language (PCL). Such document origination systems include systems sold under the following trade names: Metavante Insight, Laser Pro, Deposit Pro, ARTA Lending, Microsoft Word, Adobe Acrobat, Web browsers, such as Internet Explorer and Netscape, OSI and virtually any application that uses Microsoft Word or Adobe templates.

Virtual Printer.

In accordance with one aspect of the invention, documents are printed in a normal manner, for example, by way of a known function, for example, as available with the Windows® operating system. Rather than printing to a normal printer, document print requests are automatically captured and directed to a virtual printer 34. The captured documents are converted to TIFF format. As mentioned above, systems for converting documents in various formats to TIFF format are known in the art, for example, as disclosed in U.S. Pat. Nos. 6,672,212 and 6,995,853. The TIFF format includes an image of the document and embedded text. In certain aspects, information (e.g., index values) captured from the print stream of documents, as well as those that may be manually entered by the user, can be used to generate new documents leveraging image templates defined by the administrator. These documents, as set forth herein, can then be presented to the user for electronic signing and archival to an ECM system.

Document Launcher.

As indicated within the function block 36, after a document is converted to TIFF format, the document is directed to document launcher. The document launcher 36 is used for various purposes. In particular, the document launcher 36 is used for automatic document classification and index classification. As will be discussed in more detail below both functions are user configurable. As will be discussed in more detail below, key words to identify documents types as well as index data are user configurable. In addition the document launcher 36 may be configured with various user configurable document disposition options. For example, there may be some documents that cannot be classified by way of the document classification template. These unclassified documents may be configured to be sent to a physical printer and/or displayed. The document en launcher 36 may also be configured to automatically print to a printer and/or be displayed.

The legacy DMS/ECM systems 48 disclosed herein may be accessed by, or otherwise integrated, with a portable device. For example, documents can be displayed on mobile devices, such as phones, PDAs, tablets, etc., for review and to complete the signature process disclosed herein (e.g., via the touch screen interface of the mobile device). Further, document images can be captured via the camera present on the mobile device. These images can be classified by the user and/or automatically inherit the index values of any other documents present from the print stream capture process. However, the user may also have the ability to enter additional index values manually if desired. Further, the DMS/ECM systems 48's administrator can configure electronic forms, with a wizard approach, to capture information required to generate agreements for signature as well as pass setup information for new services/accounts downstream to core and other line of business applications. This may be accomplished using a traditional computer set up, or a mobile device.

Automatic Document Classification.

As mentioned above, the document launcher 36 is used to automatically classify any document that is directed to the virtual printer. More specifically, the print stream of the embedded text in the converted TIFF document is compared with a document classification template in order to classify a document. The document classification template is configurable and may consist of one or more key words per document type that are stored and can be used to automatically classify and index to enable the document to be stored for archival purposes. In particular, a document type and one or more key words associated with the document type may be pre-configured as a document classification template.

For example, an exemplary document classification template may be used to identify a document type as a "Loan Application". The key word "Loan" may be associated with the Loan Application document type since the word "loan" will appear at least once in any loan document. For example, in the case of a Loan Application, when the system analyzes the print stream of a converted TIFF document by comparing the text in the print stream with stored document classification templates, and the word "Loan" is detected, the document is automatically classified as a loan application, for example.

Other document types may include Signature Cards; Transaction slips, such as Withdrawal Slips and Deposit Slips, as well as other financial records. An exemplary key word "signature" may be used for identifying signature cards. Similarly, an exemplary key word "withdrawal" may be used for identifying withdrawal slips. The key word "deposit" may be used to identify for deposit slips, as well as other key words selected to identify other financial records. The system also enables additional document classification templates to be created by enabling new document types to be stored and associated with one or more key words.

Based on the document type, the system is also able to identify whether additional input is required. For example, as mentioned above, documents, such as signature cards, loan documents require additional customer input prior to archival. Other documents, that do not require further customer input include personal include: customer IDs, customer photographs and customer loan supporting documentation and transaction slips, such as deposit slips and withdrawal slips.

Whether or not the document requires additional customer input is associated with the document type, for example, as discussed above. As such, once the document type is determined, whether the document requires additional user input is also known. For documents which do not require any further user input, various document dispositions may be configured. For example, the system may be configured to automatically print the document at a physical printer Automatic Index Data Extraction.

The document launcher 36 is able to index various key words related to account data and customer data for data base storage and retrieval. Exemplary account data may include the account number; branch number as well as other account data. The customer data may include the customer name; customer social security number as well as other customer data. As used herein, the term indexing is used to identify data in the print stream for storage in searchable fields in a data base for storing and retrieving a document. The indexed data allows the document to be stored in a data base and searched by various fields defined by the indexed data. For example, one or more key words may be used to capture data from the print stream in order to store the data in a searchable field in a database. For example, the key words the key words "customer name" may be used to capture and extract data from the print stream following the key words to identify the customer name.

Figure 2:
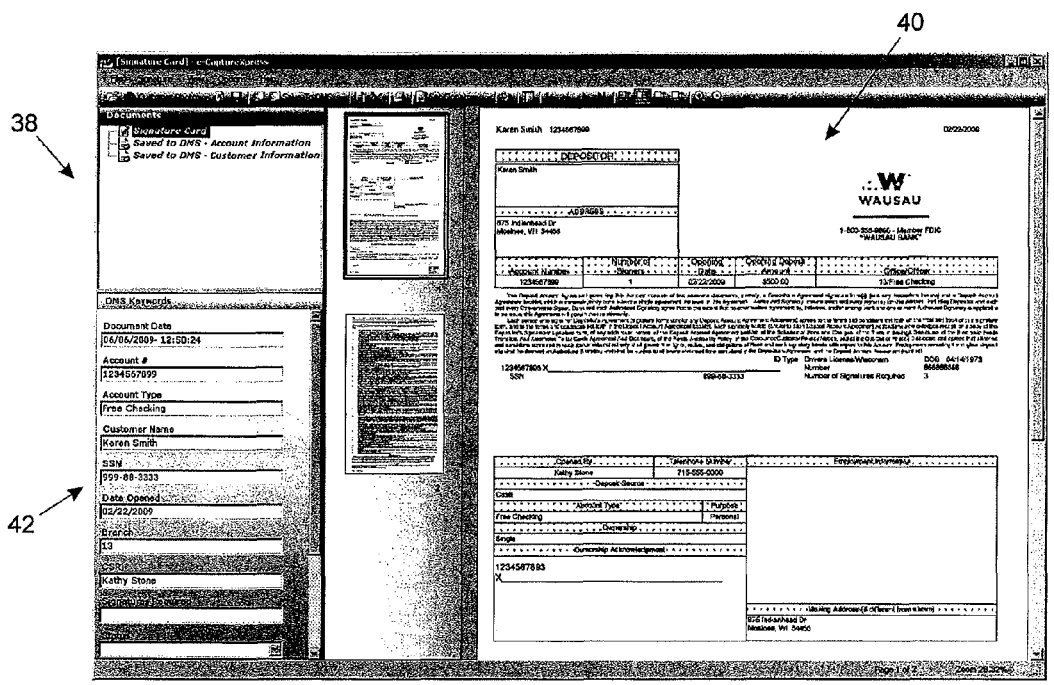
FIG. 2 is an exemplary screen shot illustrating an exemplary signature card and associated key words.

An exemplary screen shot for an exemplary signature card is illustrated in FIG. 2 and identified with the reference numeral 38. The screen shot 38 includes various portions. The right hand portion illustrates an exemplary electronic signature card, generally identified with the reference numeral 40. The left hand portion of the screenshot 38, generally identified with the reference numeral 42, illustrates the various user configured key words used for indexing the customer and account information with respect to the data base. For the exemplary signature card 40 shown, it may be stored under and retrieved by way of any of the key words listed on the left side 42 of the screen shot 38. As mentioned above, the key words are user selectable and may be selected be used with existing databases. As shown in FIG. 2, each key word includes a dialog box beneath it for receiving the indexed data. For documents that can be classified, data from the print stream is auto-filled into the dialog boxes.

User Interface.

Referring back to FIG. 1, after the document is processed by the document launcher 36, an electronic image of the document is directed to a user interface, generally identified with the reference numeral 44. The user interface 44 may be used for various functions including the following functions: (1) Apply signatures; (2) Scan documents; (3) Incorporate customer photos; (4) Verify Customer Signatures; and (5) Print Documents.

Figure 3:
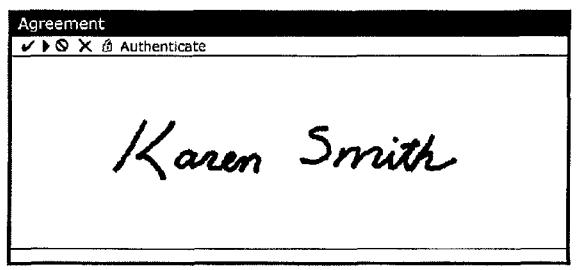
FIG. 3 is an exemplary dialog box illustrating an exemplary signature image.

FIG. 3 illustrates an exemplary flow diagram for processing various documents by the user interface 44. As illustrated in block 48, the user interface 44 may include "Complete Document" button assuming that the system has been configured, as indicated by the block 46. For systems provided with a "Complete Document" button, the system waits until the user selects the button, as indicated in block 50. Once the "Complete Document" button is selected, the system automatically determines whether a signature is required in step 52, in a manner as discussed above. If a signature is required and no signature has been applied, as indicated in step 54, the system waits for an optional "Set Signature" button to be selected. Once the "Set Signature" button is selected, the system displays a missing signature dialog box, as indicated by the block 56. The customer is then directed to provide their signature on a conventional electronic signature pad, for example a Topaz signature pad, configured as a TWAIN interface. Such TWAIN interfaces are known to enable images from an electronic signature pad, scanner, digital camera or other device to be imported directly into an application. As such, should a customer signature be required, the signature is automatically captured and imported directly into the application and added to the signature block on the electronic document in a known manner, for example as disclosed in U.S. Pat. No. 7,568,104, hereby incorporated by reference. If additional signatures are required on the current document the signature dialog will move to the next signature box on the document to capture additional signatures. In certain aspects, a document may require a physical print of additional signatures outside of the electronic process. Such documents may have a barcode overlay applied. The barcode may be, for example, a variable length, discrete barcode symbology (e.g., Alpha39), 2D barcodes, such as QR codes, and the like. Regardless of the barcode type, they barcode may convey information, or a reference to such information, including the document type any desired index values, etc. Upon scanning of any document with these barcode overlays the barcode, for example, may be utilized to automatically classify the document type and add the configured index values After the signatures have been added or if no signatures are required, the system checks whether a default physical printer, as indicated by the block 58. If the default printer has been selected, as indicated by the block 60, the system prints the document, as indicated by the block 62. After the document is printed, the document is saved to the document management system (DMS) or database, as indicated by the block 64. Alternatively, if the default printer was not selected, the system displays a dialog box for the user's printer preference, as indicated by the block 66. Once the user specifies a printer, as indicated by the block 60, the system proceeds to steps 62 and 64, as discussed above.

Figure 4:
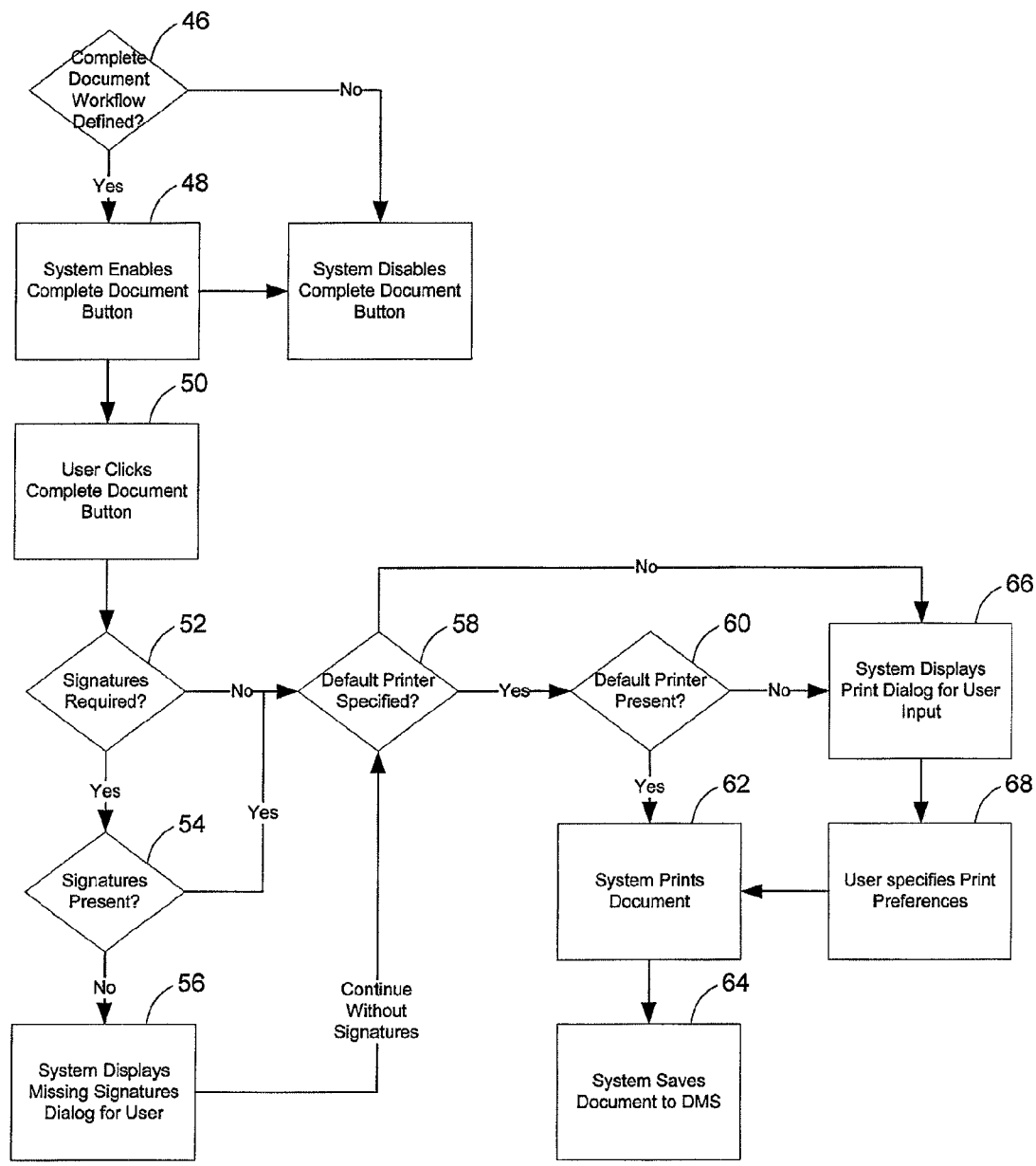
FIG. 4 is an exemplary flow diagram for processing an electronic document.
Figure 5:
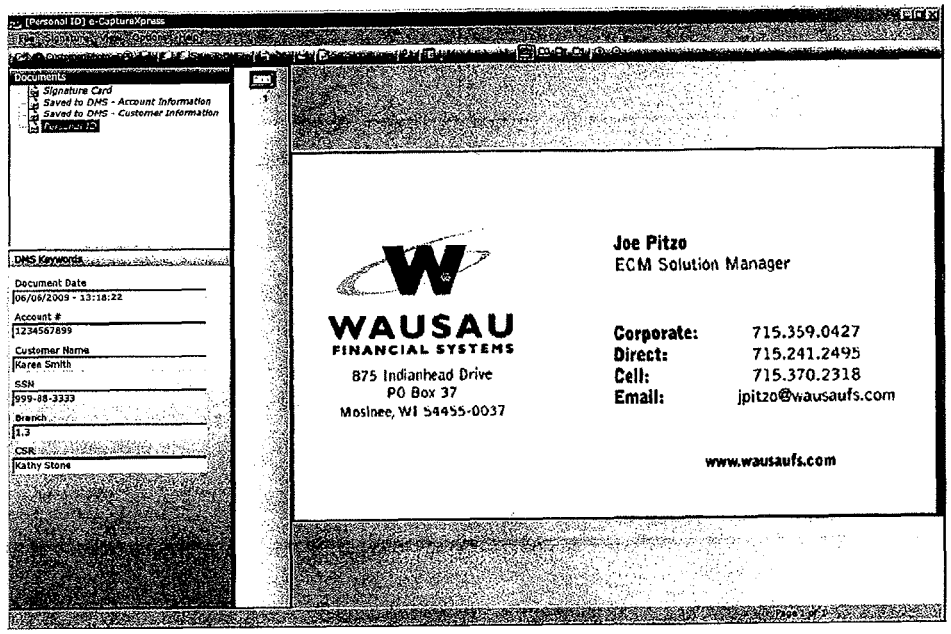
FIG. 5 is an exemplary screen shot illustrating exemplary personal information imported into the system.

Captured signatures are displayed in a dialog box, for example, as illustrated in FIG. 4. These captured signatures are stored in the DMS and used for verification of customer signatures. In addition, printed documents, passports, driver's licenses, customer photos etc. can be captured by way of a scanner or a digital camera and a TWAIN interfaces and stored in the DMS. As illustrated in FIG. 5, the captured data can be selectively correlated with index values of a document already stored in the DMS. For example, FIG. 5 illustrates a business card scanned byway of a Fujitsu Type fi60f scanner.

DMS Bridge.

An important aspect of the system is the DMS bridge, generally identified with the reference numeral 46. The DMS bridge 46 serves as a single collection point for all documents captured by the system. The DMS bridge 46 transforms data captured by the system into an image/data format that can be utilized with various different legacy document management systems. Once transformed, the data is sent to the legacy ECM 48 for archival and further processing. For example, the enterprise content management system 20 in accordance with the present invention may be interfaced with the following legacy document manager systems: (1) OnBase; (2) FileNet; (3) Documentum; and (4) Open Text.

The DMS bridge 46 receives images and meta data for each document. Meta data relates to information regarding the data. For example, referring back to FIG. 2, the key word data on the left portion 38 of the document 42 constitutes the metadata associated with the exemplary signature card 38 illustrated. For example, this metadata may include account data and customer data, as discussed above and as illustrated and described, for example, in U.S. Pat. No. 7,213,022, hereby incorporated by reference. In accordance with an aspect of the invention, as mentioned above, the user configurable key words which define the meta data, as discussed above, are selected to correspond to fields in a legacy DMS. The DMS bridge 46 is configured to be interfaced with a designated legacy DMS. The DMS bridge 46 is used to convert the metadata and images received by the DMS bridge 46 to a format compatible with the legacy DMS 48. As such, the DMS bridge 46 enables the distributed capture system to be seamlessly integrated with a customer's legacy ECM/DMS system. An exemplary DMS Bridge 46 for use with the present invention is available under the trade name MavBridge, available from Mavro Imaging, http://mavroimaging.com, hereby incorporated by reference. Other DMS bridges are also suitable for use with the present invention.

Exemplary System Configuration.

Figure 6:
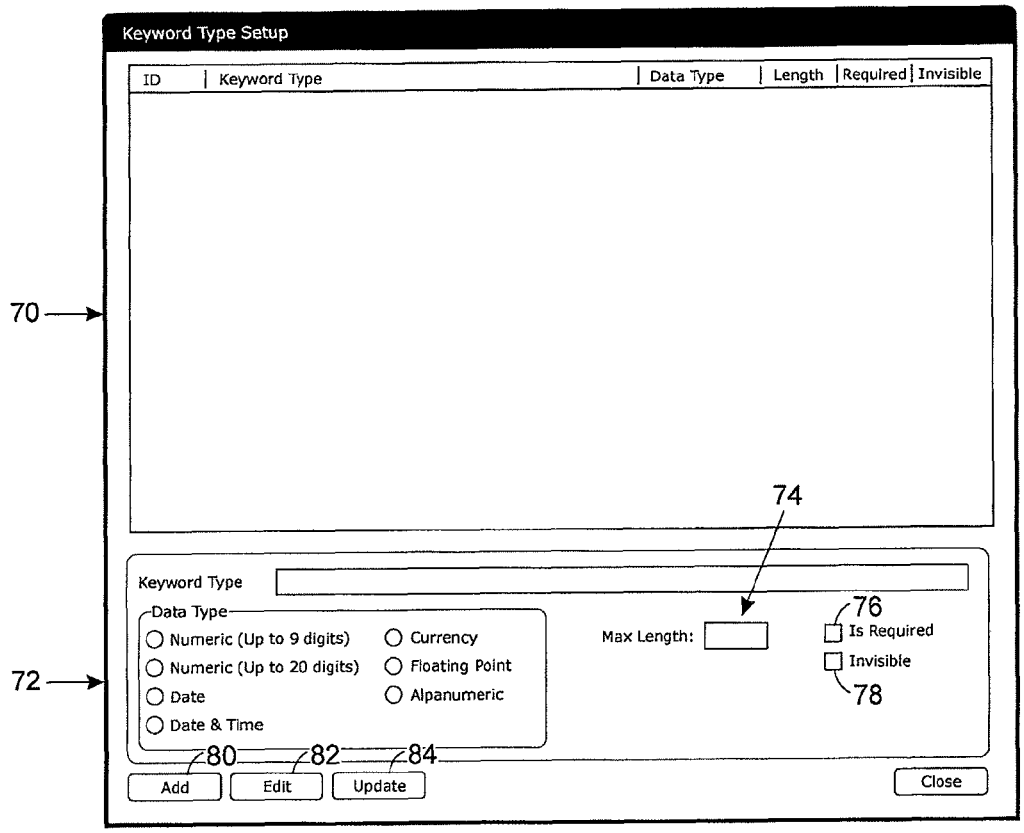
FIG. 6 illustrates an exemplary administration screen for configuring the system.

As mentioned above, the key words used for indexing and document identification are user selectable, in accordance with an important aspect of the invention, the key words associated with the data indexing are selected to correspond to database fields in a legacy DMS/ECM. An exemplary dialog page for configuring the format of the key words is illustrated in FIG. 6 and generally identified with the reference numeral 70. As shown, various formats can be selected for the format of the key words. These formats are configured to correlate with a plurality of legacy DMS/ECM systems 48. Exemplary formats are illustrated selectable by radio buttons, generally identified with the reference numeral 72. These formats may include the following formats: (1) Numeric up to 9 digits; (2) Numeric up to 20 digits; (3) Date; (4) Date & Time; (5) Currency; (6) Floating Point; and (7) Alphanumeric.

In addition to selecting the data format for the key word, the maximum length of the key word is optionally entered into the dialog box 74. The dialog page may include additional dialog boxes in order to configure the data format for a key word. For example, an "Is Required" check box 76 may be provided. The "Is Required" check box 76 may be used to force a value to be present in the dialog box 74 before a document can be saved. An "Invisible" check box 46 may be provided. The "Invisible" check box 78 may be used to hide the keyword from the user. An "Add" button 80 allows the key word set up to be completed.

As mentioned above key words are used to identify document types. The document types may also be user configured, for example, by way of a dialog page Two (2) additional buttons 82 and 84 may be provided to allow existing document types to be edited by selecting a document type and selecting the "Edit" button 82. Once the document type is edited, the "Update" button 84 is selected to store the change.

Obviously, many modifications and variations of the present invention are possible in light of the above teachings. Thus, it is to be understood that, within the scope of the appended claims, the invention may be practiced otherwise than as specifically described above.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the invention as defined by the following claims.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed:

1. A distributed capture system for managing legacy documents, the distributed capture system comprising:
   a data storage device; and
   a processor operatively coupled to a memory device, said data storage device, and a user-input device configured to receive an input from a user, the processor being configured to,
   receive an electronic legacy document, wherein said electronic legacy document is one of a plurality of original electronic formats,
   determine whether the electronic legacy document requires one or more signatures from the user, wherein a barcode overlay is applied to request the one or more signatures,
   enable the user to input a at least one of said one or more signatures, wherein (1) if said signature is detected, the detected signature is subsequently applied to the electronic legacy document pursuant to a predetermined rule, and (2) if no signature is detected, the processor enables the conversion of the electronic legacy document,
   convert the electronic legacy document, including any signature applied to the electronic legacy document, from the one of a plurality of original electronic formats to a format that is compatible with a plurality of different document management systems, said format comprising an image portion and a text portion,
   generate an index having a plurality of document keywords, wherein the index is generated based at least in part on the text portion associated with the electronic legacy document,
   access one or more document classification templates, each of said one or more document classification templates representing a different document type, wherein each of said one or more document classification templates comprises one or more template keywords,
   compare one or more of said document keywords with one or more of said template keywords for one or more of said document classification templates,
   match the electronic legacy document with one or more document classification templates identified during said comparison step,
   classify the electronic legacy document as one or more of a plurality of document types based at least in part upon the one or more document classification template matches identified during said match step, and
   store the electronic legacy document to said data storage device using an encryption technique.

2. The distributed capture system of claim 1, wherein said plurality of original electronic formats includes at least two of: (1) a word processing file format, (2) portable document format (PDF), (3) hypertext markup language (HTML), and (4) printer control language (PCL).

3. The distributed capture system of claim 1, wherein the signature from the user is provided via a touch-sensitive device configured as a TWAIN interface.

4. A distributed capture system for managing legacy documents, the distributed capture system comprising:
  a data storage device; and
  a processor operatively coupled to a memory device, said data storage device, and a mobile user-input device configured to receive an input from a user, the processor being configured to,
  receive an electronic legacy document, wherein said electronic legacy document is one of a plurality of original electronic formats,
  determine whether the electronic legacy document requires a user input from the user,
  enable the user to input a user input via the mobile user-input device, wherein
    if said user input is detected, the user input is subsequently applied to the electronic legacy document pursuant to a predetermined rule, and
    if no user input is detected, then the processor enables the conversion of the electronic legacy document,
  convert the electronic legacy document, including any user input applied to the electronic legacy document, from the one of a plurality of original electronic formats to a predetermined format that is compatible with a plurality of different document management systems, said predetermined format comprising an image portion and a text portion,
  generate an index having a plurality of document keywords, wherein the index is generated based at least in part on the text portion associated with the electronic legacy document,
  access one or more document classification templates, each of said one or more document classification templates representing a different document type, wherein each of said one or more document classification templates comprises one or more template keywords,
  compare one or more of said document keywords with one or more of said template keywords for one or more of said document classification templates,
  automatically match the electronic legacy document with one or more document classification templates identified during said comparison step,
  automatically classify the electronic legacy document as one or more of a plurality of document types based at least in part upon the one or more document classification template matches identified during said match step, and
  store the electronic legacy document to said data storage device.

5. The distributed capture system of claim 4, wherein the one or more of a plurality of document types include at least one of a loan application, a signature card, loan supporting documentation, and a withdrawal slip.

6. The distributed capture system of claim 4, wherein said plurality of original electronic formats includes at least two of: (1) a word processing file format, (2) portable document format (PDF), (3) hypertext markup language (HTML), and (3) printer control language (PCL).

7. The distributed capture system of claim 4, wherein the predetermined format is a Tagged Image File Format file.

8. The distributed capture system of claim 4, wherein the user input comprises a signature.

9. The distributed capture system of claim 8, wherein the mobile user-input device comprises a touch-sensitive device.

10. The distributed capture system of claim 9, wherein the touch-sensitive device is configured as a TWAIN interface.

11. The distributed capture system of claim 4, further comprising a display for displaying to the user the image and the text as classified and indexed by the distributed capture system.

12. The distributed capture system of claim 11, wherein the display receives at least one of: (1) an electronic signature from the user to be associated with the image and the text; (2) additional documents from the user to be associated with the image and the text; (3) additional images from the user to be associated with the image and the text; (4) verification of a signature associated with the image and the text from the user; or (5) a command from the user to print at least a portion of the image and the text.

13. The distributed capture system of claim 4, wherein the electronic legacy document stored to said data storage device is encrypted.

14. The distributed capture system of claim 4, wherein the distributed capture system is configured to communicate the electronic legacy document to a separate computer system.

15. A method managing legacy documents, the method comprising:
  receiving an electronic legacy document, wherein said electronic legacy document is one of a plurality of original electronic formats,
  determining, via one or more computers, whether the electronic legacy document requires a user input from the user,
  enabling the user to input the user input via a mobile user-input device, wherein
    if said user input is detected, the user input is subsequently applied to the electronic legacy document pursuant to a predetermined rule, and
    if no user input is detected, then the computer enables the conversion of the electronic legacy document,
  converting, via said one or more computers, the electronic legacy document, including any user input applied to the electronic legacy document, from the one of a plurality of original electronic formats to a predetermined format that is compatible with a plurality of different document management systems, said predetermined format comprising an image portion and a text portion,
  generating, via said one or more computers, an index having a plurality of document keywords, wherein the index is generated based at least in part on the text portion associated with the electronic legacy document,
  accessing, via said one or more computers, one or more document classification templates stored to a data storage device, each of said one or more document classification templates representing a different document type, wherein each of said one or more document classification templates comprises one or more template keywords,
  comparing, via said one or more computers, one or more of said document keywords with one or more of said template keywords for one or more of said document classification templates,
  automatically matching, via said one or more computers, the electronic legacy document with one or more document classification templates identified during said comparison step,
  automatically classifying, via said one or more computers, the electronic legacy document as one or more of a plurality of document types based at least in part upon the one or more document classification template matches identified during said match step, and storing, via said one or more computers, the electronic legacy document to said data storage device.

16. The method of claim 15, wherein the predetermined format is a Tagged Image File Format file.

17. The method of claim 15, further comprising the step of displaying, to the user, the image and the text as classified and indexed by the distributed capture system.

18. The method of claim 15, wherein the mobile user-input device comprises a touch-sensitive device.

19. The method of claim 15, wherein the touch-sensitive device is configured as a TWAIN interface.

20. The method of claim 15, wherein the data storage device is keyword searchable via one or more searchable fields in the legacy document management system.

* * * * *